United States Patent [19]

Nelli et al.

[11] 4,395,508

[45] Jul. 26, 1983

[54] POLYCONDENSATES OF SUBSTITUTED PIPERIDINES AND USE THEREOF AS STABILIZERS FOR POLYMERS

[75] Inventors: Giuseppe Nelli; Roberto Oriani, both of Milan, Italy

[73] Assignee: Montedison S.p.A., Milan, Italy

[21] Appl. No.: 287,908

[22] Filed: Jul. 29, 1981

Related U.S. Application Data

[63] Continuation of Ser. No. 163,085, Jun. 26, 1980, abandoned.

[30] Foreign Application Priority Data

Jun. 28, 1979 [IT] Italy .............................. 23947 A/79

[51] Int. Cl.³ .................. C08K 5/34; C08K 5/16; C08G 73/00; C07D 211/30
[52] U.S. Cl. ..................................... 524/103; 524/186; 546/190; 528/367; 528/369; 528/423; 525/186
[58] Field of Search ............... 524/103, 186; 546/190, 546/229, 237; 528/367, 369, 423; 525/186

[56] References Cited

U.S. PATENT DOCUMENTS

| 4,086,207 | 4/1978 | Cassandrini et al. | 524/100 |
| 4,104,248 | 8/1978 | Cantatore | 524/103 |
| 4,198,334 | 4/1980 | Rasberger | 546/190 |
| 4,223,147 | 9/1980 | Oertel et al. | 524/103 |
| 4,237,297 | 12/1980 | Rody et al. | 524/103 |

OTHER PUBLICATIONS

L. Tompkins, Derivatives of Urethan: Azamalonic Esters, J.A.C.S. 69, pp. 2616–2617 (1947).
Gessner G. Hawley, The Condensed Chemical Dictionary, 1977, p. 82.

*Primary Examiner*—John Kight, III
*Assistant Examiner*—K. S. Morgan

[57] ABSTRACT

New polycondensates of alkyl-substituted piperidines are disclosed. These new polycondensates are useful for stabilizing thermoplastic polymers, in particular polyolefins, against sunlight, heat and oxidation.

A process for producing the new polycondensates is also disclosed, as well as the polymeric compositions stabilized with said new polycondensates.

15 Claims, No Drawings

POLYCONDENSATES OF SUBSTITUTED PIPERIDINES AND USE THEREOF AS STABILIZERS FOR POLYMERS

This is a continuation of application Ser. No. 163,085 filed June 26, 1980, now abandoned.

THE PRIOR ART

As is known, in order to improve the thermo- and photo-oxidative stability of the synthetic polymers, use is generally made of some stabilizing substances, which may be antioxidizers, light stabilizers or mixtures thereof.

Among the various stabilizers proposed for this purpose, the sterically hindered cycloaliphatic amines are the ones which, under equal concentration, exert a higher stabilizing activity.

Compounds belonging to such class of stabilizers are the derivatives of 2,2,6,6-tetra-alkyl-piperidine.

In particular, U.S. Pat. No. 4,104,248 discloses polymeric compounds containing the group of 4-amino-2,2,6,6-tetra-alkyl-piperidine.

As is known, the above-mentioned U.S. Pat. No. 4,104,248 discloses poly-(2,2,6,6-tetra-alkyl-4-piperidyl)amines having the general formula

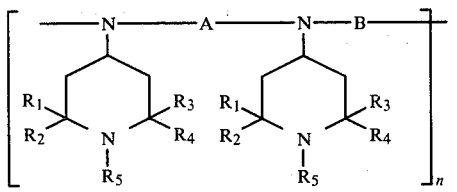

wherein; each of $R_1$, $R_2$, $R_3$ and $R_4$, which may be the same or different, is an alkyl group having 1 to 4 carbon atoms; $R_5$ is hydrogen or an alkyl group having 1 to 4 carbon atoms; A is an alkylene group having 2 to 10 carbon atoms; B is a divalent aliphatic, cycloaliphatic, aromatic or alkyl-aromatic radical, which may contain hetero-atoms such as O, N, S or P either in a chain or as side substituents, and n is a whole number between 2 and 1000.

The above-said U.S. Patent discloses also the polymeric compositions stabilized with the poly(2,2,6,6-tetra-alkyl-4-piperidyl)amines having the above-indicated formula (I).

THE PRESENT INVENTION

We have now discovered that when "B", in the above-indicated formula (I), is a divalent radical deriving from the aza-malonic acid, the antioxidizing properties of such polymeric compounds are remarkably improved.

The stabilizers exhibiting the improved anti-oxidizing properties are, therefore, the polyamides of N,N'-bis(2,2,6,6-tetra-alkyl-4-piperidyl)-alkylene-diamine with aza-malonic acid, having the general formula:

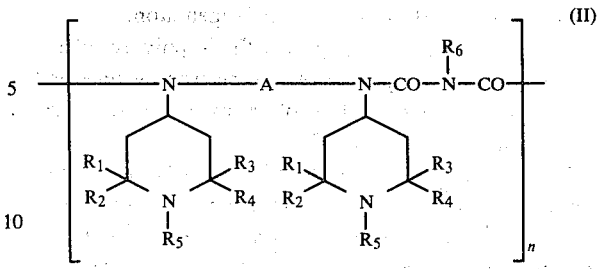

wherein: each of $R_1$, $R_2$, $R_3$ and $R_4$, which may be the same or different, in an alkyl radical having 1 to 4 carbon atoms; $R_5$ is hydrogen or an alkyl radical having 1 to 4 carbon atoms; $R_6$ is hydrogen or an alkyl radical having 1 to 20 carbon atoms, a cycloalkyl radical having 3 to 10 carbon atoms, or an aryl or alkyl-aryl radical having from 6 to 20 carbon atoms; A is an alkylene group having 3 to 10 carbon atoms or a cyclo-alkylene group having 3 to 10 carbon atoms and n is an integer from 2 to 100.

The present invention provides, too, compositions based on thermoplastic synthetic polymers, stabilized to oxidation and to ageing, containing as stabilizer, one of the polyamides having general formula (II) indicated hereinbefore, in an amount sufficient to prevent any degrading action.

The term "thermoplastic synthetic polymers", whenever used in the present specification and in the claims means all the thermoplastic polymeric substances usually subjected to degradation due to the action of oxygen, of light and heat, when they are exposed to atmospheric agents or to heat treatments both during processing, transformation and use thereof.

Thermoplastic substances which can be stabilized with the polyamides having general formula (II), according to the present invention, include, for instance:

polyolefins, such as homopolymers of olefins, among which high and low density polyethylene, polypropylene, polystyrene, polybutadiene, polyisoprene and the like, and copolymers of the olefins with other ethylenically unsaturated monomers, such as ethylene-propylene copolymers, ethylene-butene copolymers, styrene-butadiene copolymers, styrene-acrylonitrile copolymers and acrylonitrile-styrene-butadiene copolymers;

polyvinyl chloride and polyvinylidene chloride, including both the homopolymers and the copolymers of vinyl chloride and of vinylidene chloride with each other or each of them with vinyl acetate or other ethylenically unsaturated monomers;

polyacetals such as polyoxymethylene and polyoxyethylene;

polyesters such as polyethylene-terephtalates;

polyamides such as nylon 6, nylon 6—6 and nylon 6-10;

polyurethanes;

polycarbonates;

butadiene-styrene copolymers;

natural and synthetic rubbers, etc.

Such synthetic polymers can be used either in the form of powder or granules, or as shaped articles, such as for instance: fibers, films, sheets, and other shaped articles, or as latexes and foams.

Among the above-cited synthetic polymers, the most suitable ones for being used, according to the present invention, are the polyolefins deriving from monomers having the general formula: R—CH=CH$_2$, wherein R is an alkyl or aryl group, or a hydrogen atom.

The present preferred polyolefin is polypropylene, consisting prevailingly of isotactic macromolecules and obtained by polymerization of propylene in the presence of stereo specific catalyst.

The present preferred polyamides of N,N'-bis(2,2,6,6-tetra-alkyl-4-piperidyl)-alkylene-diamine with aza-malonic acid, having general formula (II) for use in the practice of the present invention are those in which $R_1$, $R_2$, $R_3$, $R_4$ are each methyl, $R_5$ is hydrogen, $R_6$ is hydrogen, A is an alkylene radical having 3 to 6 carbon atoms and n is an integer from 2 to 20.

The polyamides of general formula (II) can be synthesized by polycondensation of N,N'-bis(2,2,6,6-tetra-alkyl-4-piperidyl) alkylene-diamine with an ester of the aza-malonic acid according to the reaction:

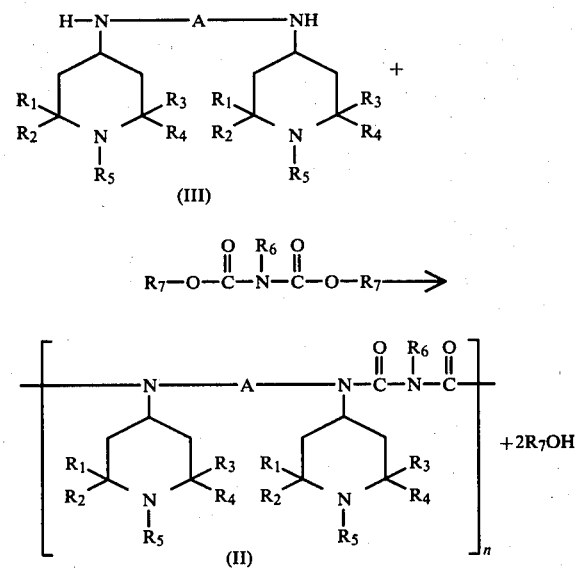

wherein $R_1$, $R_2$, $R_3$, $R_4$, $R_5$, $R_6$, A and n have the meanings indicated hereinabove and $R_7$ is an alkyl radical having 1 to 5 carbon atoms.

The polyamides of general formula (II) may also be synthesized by carrying out the polycondensation of N,N'-bis(2,2,6,6-tetra-alkyl-4-piperidyl) alkylene-diamine with biuret according to the reaction:

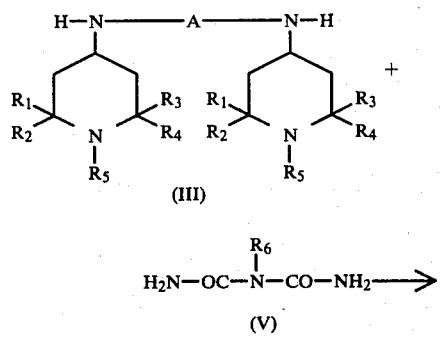

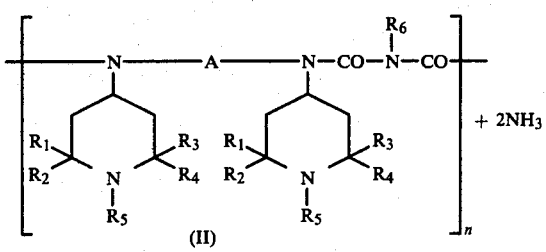

The polycondensation occurs by heating of the mixture of the two reagents, in the presence or in the absence of a solvent or of a dispersant. The alcohol or the ammonia resulting from the polycondensation reaction is removed by distillation.

The presence of catalysts such as alcoholates of an alkaline metal, lithium hydride, lithium amide or the like can facilitate the completion of the reaction.

The physical properties of the polyamides of general formula (II) vary upon variation of the molar ratio of the two reagents, which preferably, but not necessarily, is 1:1, and depending on the nature of radical $R_6$. Generally, the obtained polyamide is a water-insoluble white powder.

In practice, mixtures of polymeric chains having different values of n are obtained. The average value of n in the mixture generally ranges from 4 to 10.

The diamine having general formula (III) can be preferably obtained by reacting a diamine with 2,2,6,6-tetra-alkyl-4-piperidin-one and hydrogen, under pressure, in the presence of a hydrogenation catalyst, such as platinum, according to the reaction:

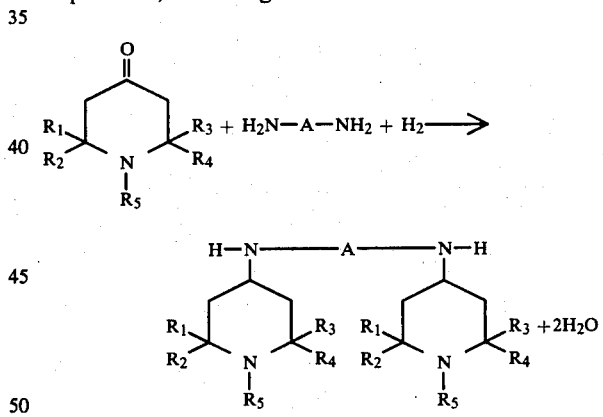

The derivatives of the aza-malonic acid can be synthesized according to any known process. Thus, for example, the ethyl ester of the aza-malonic acid can be prepared by reacting ethyl chloroformate with ethyl urethane. The N-alkyl-derivatives of the diester of the aza-malonic acid can be prepared by reaction of chloro-alkanes with the N-sodium derivative of the diester.

The amount of polyamide, having general formula (II), to be added to the thermoplastic synthetic polymer to be stabilized, according to the present invention, is not critical and may vary over a wide range as a function of the type, properties and particular uses of the polymer. Generally, said stabilizers can be added to the polymers in amounts ranging from 0.01 to 5.0% by weight, based on the polymer weight; in practice, however, the effective amount varies as a function of the type of polymer to be stabilized. Thus, for instance, in the case of polyolefins, an effective amount can range from 0.01 to 2% by weight; in the case of polyvinyl chloride and polyvinylidene chloride such amount can range from 0.01 to 1% by weight, while for polyurethanes and polyamides such amount can vary from 0.01 to 5% by weight.

The stabilizer having general formula (II) can be employed either alone or in admixture with other known additives, such as antioxidants, ultraviolet ray adsorbers, pigments, fillers, basic nitrogen containing polycondensates, other stabilizers.

Some examples of such additives are oxy-benzotriazoles, oxy-benzo-phenones, Ni-stabilizers, metal soaps, phenolic anti-oxidants, phosphites, thioesters, hydroquinone derivatives, triazine compounds, acrylamine-phenols, benzyl-phosphonates, etc.

Such additives can be used together with the polyamides having general formula (II), according to the present invention, in a ratio by weight ranging from 0.5:1 to 3:1.

The incorporation of the polyamides having general formula (II) or the mixture containing said polyamides into the synthetic polymer may be carried out according to any known procedure and at any stage prior to or during the manufacturing of the shaped article from the polymer. Thus, for example, it is possible to effect a simple admixing of the additives in powder form, under stirring, to the polymer, or the polymer can be mixed with a solution of the stabilizers in a suitable solvent, which is then evaporated; or the stabilizers can be added to the polymer at the end of the polymerization.

Furthermore it is possible to get the stabilizing action by applying the stabilizer on the manufactured article, for instance by dipping it into a solution or dispersion of the stabilizers and then by evaporating the solvent or the dispersant.

The following non-limiting examples are given for a more detailed understanding of the present invention and for further enabling those skilled in the art to practice the same.

In the examples, unless otherwise specified, all the parts are given by weight.

EXAMPLE 1

Preparation of poly[N,N'-bis(2,2,6,6-tetra-methyl-4-piperidyl)-hexamethylene-aza-malono-diamide]

4.5 g (0.05 moles) of ethyl urethane were dissolved in 40 cc of anhydrous xylene into a 250 cc. flask equipped with a stirrer, a heating sleeve and a thermometer and connected to a vacuum pump. 1.1 g (0.05 moles) of metal sodium were added to the solution and the mixture was stirred until complete dissolution.

5.4 g (0.05 moles) of ethyl chloroformate were gradually added, in about 1 hour, to the solution, and the mixture was heated to 90° C. and stirred for about 1 hour. After filtering for removing sodium chloride, 20 g (0.05 moles) of N,N'-bis-(2,2,6,6-tetramethyl-4-piperidyl)-hexamethylene diamine were added to the solution containing the diethyl ester of the aza-malonic acid. The solution was heated to 135°–140° C., under continuous stirring, for two hours, distilling ethanol as it formed. Successively, the solution was cooled down, the xylene layer was washed twice with water and the solvent was removed. A white powder was obtained, having a melting point of 225°–230° C., an average molecular weight of 2300, determined osmometrically, and a nitrogen content of 15%.

On the basis of the nitrogen content, of the molecular weight and of the results of the nuclear magnetic resonance (N.M.R.) and I.R. analyses, to the compound was attributed the following structural formula:

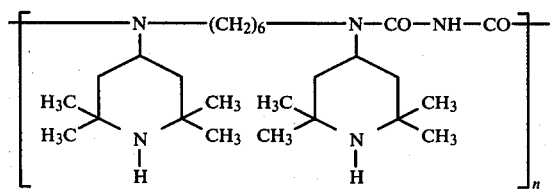

wherein the mean n was 5.

STABILIZATION TESTS 200 cc of chloroform containing, dissolved therein, the polyamide prepared as described hereinbefore and in the amount as indicated in Table I, were added to 300 g of non-stabilized polypropylene, having an intrinsic viscosity, determined at 130° C. in tetralin, of 162 cc/g, a residue after the extraction of the crude polymerizate with heptane of 96.5% and an ash content of 80 ppm.

The mixture was stirred for about 6 hours at room temperature in a rotary evaporating apparatus; whereupon it was dried at 0.01 mm of Hg and at 50° C. for 1 hour. The additioned powder so obtained was extruded in a Brabender extruder at 220° C. and granulated. The granules were molded to films and small plates at 200° C., for 3 minutes, by compression between two square steel plates measuring 20 cm of side and under a load of 1000 kg. The films so obtained had a uniform thickness of 50–60 microns and the plates a thickness of 1 mm and were practically colorless and homogeneous.

The thermal-oxidative and the photo oxidative stabilities were determined on the specimens so obtained.

As thermal-oxidative stability value the induction period (IP) on the films and the resistance to ageing in oven (I.T.) on the small plates were assumed.

As induction period (IP) of thermo-oxidation at 170° C. and 760 mm of HG of oxygen, was considered the time required for getting a quick increase of the oxygen absorption rate. As resistance to ageing in oven was considered the time (IT) required to evidence at naked eye, cracks or chalking of the surface or other modifications of the examined plate, after exposure of the test piece in an oven at 150° C. in an air stream.

As photo-oxidative stability, the embrittlement time was assumed. As embrittlement time was considered the time required to cause the rupture of the film by only one bending at 180°, after exposure to Xenotext 1200 under the following operative conditions:
temperature of the black panel: 45° C.
relative humidity: 50%
alternated exposure to the maximum U.V. intensity.

To determine the induction period (IP) of the thermo-oxidation, 0.2 g of the film were cut into pieces and introduced into a cell of about 50 cm³, in which an oxygen atmosphere was created by repeatedly removing and introducing oxygen. The cell was connected with an oxygen absorption measuring device, equipped with recording systems of the absorbed volumes. The cell was dipped into a thermostatic bath maintained at a temperature of 170° C.

The values of the induction period (IP) and of the embrittlement time (I.T.) in oven and of the enbrittlement time to Xenotest are recorded on the following Table I.

TABLE I

| Stabilizer % by weight | Thermo-oxidative stability | | Photo-oxidative stability |
| --- | --- | --- | --- |
| | IP in h | Embrittlement time (I.T.) in h | Embrittlement time in h |
| — | 0 | <24 | 60 |
| 0.3 | 8 | 140 | 1900 |
| 0.5 | 11.2 | 200 | 2600 |

EXAMPLE 2

Preparation of poly[N,N'-bis-(2,2,6,6-tetramethyl-4-piperidyl)-hexamethylene-aza-N-n-octyl-malono-diamide]

By operating according to example 1, a solution of 0.2 moles of diethyl aza-malonate in xylene was prepared. After having removed the sodium chloride by filtration, 11.2 g (0.2 moles) of potassium hydroxide dissolved in 50 ml of ethanol were added under stirring to the solution. The potassium salt of the diethyl-aza-malonate precipitated. After filtration and drying of the residue, 30 g of a white powder were obtained. The product was dissolved in 150 ml of anhydrous dimethylformamide, and to the resulting solution 41 g (0.15 moles) of 1-bromooctane were added. The solution was heated to 120° C. and kept at such temperature for 3 hours, whereupon the dimethylformamide was removed and the residual mass was extracted 3 times with 25 ml of chloroform. Chloroform was removed from the solution by evaporation, and 39.8 g (0.146 moles) of a colorless liquid were obtained. On the basis of the N.M.R., I.R. and quantitative analyses, the following structural formula was attributed to the obtained product:

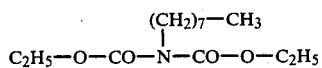

A mixture consisting of 5.5 g (0.02 moles) of this product and of 7.9 g (0.02 moles) of bis-(2,2,6,6-tetramethyl-4-piperidyl)-hexamethylenediamine was molten in a nitrogen atmosphere. The molten mixture was maintained at 180° C. and 30 Torr and was stirred for 8 hours, allowing the ethyl alcohol that formed to flow out. The reaction mass was cooled down to 80°–90° C. and 0.2 g of lithium amide were added. In order to complete the reaction, the mixture was kept at 20 Torr and at 160° C. for 3 hours, under continuous stirring. The product so obtained was dissolved at 50° C. in cyclohexane, washed three times with water and crystallized.

8 g of a white powder having a melting point of 42°–46° C. and an average molecular weight, osmometrically determined, of about 2000, were obtained.

On the basis of the N.M.R., I.R. and nitrogen content analyses, the following structural formula was attributed to the obtained product:

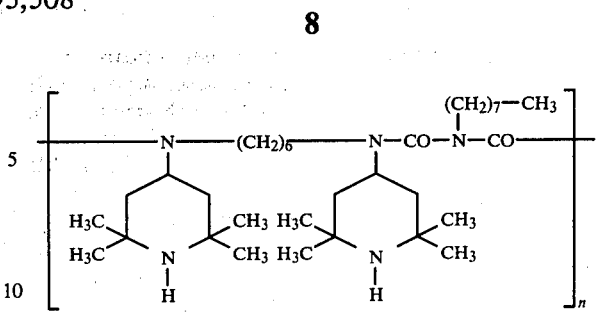

wherein the mean n is 4.

STABILIZATION TESTS

By operating according to example 1, specimens having the above-indicated dimensions were prepared.

The specimens were subjected to the thermo-oxidative and photo-oxidative stability tests, as in example 1; the results obtained are recorded on the following Table II:

TABLE II

| Stabilizer % by weight | Thermo-oxidative stability | | Photo-oxidative stability |
| --- | --- | --- | --- |
| | IP in h | Embrittlement time (I.T.) in hours | Embrittlement time in hours |
| 0.30 | 9 | 120 | 1700 |
| 0.50 | 13 | 180 | 2200 |

What we claim is:

1. Polyamides having the general formula (II):

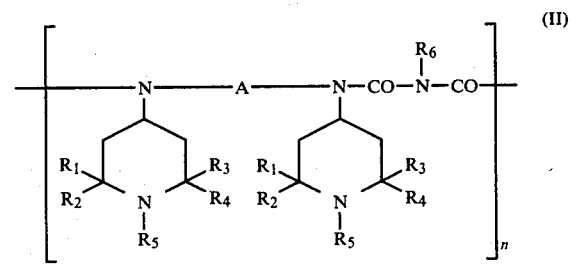

wherein: each of $R_1$, $R_2$, $R_3$ and $R_4$, which may be the same or different, is an alkyl radical having 1 to 4 carbon atoms; $R_5$ is hydrogen or an alkyl radical having 1 to 4 carbon atoms; $R_6$ is hydrogen, an alkyl radical having 1 to 20 carbon atoms, a cycloalkyl radical having 3 to 10 carbon atoms, an aryl radical or an alkyl-aryl radical having from 6 to 20 carbon atoms; A is an alkylene radical having 3 to 10 carbon atoms or a cyclo-alkylene radical having 3 to 10 carbon atoms, and n is an integer from 2 to 100.

2. Polyamides according to claim 1, in which in the general formula (II), each of $R_1$, $R_2$, $R_3$ and $R_4$ is methyl, $R_5$ is hydrogen, $R_6$ is hydrogen, A is an alkylene radical having 3 to 6 carbon atoms and n is an integer from 2 to 20.

3. A composition comprising thermoplastic synthetic polymers, stabilized to oxidation, to heat and to sun light, said composition containing incorporated therein, in an amount sufficient to prevent any degradation of the polymer, a polyamide according to claim 1 and having general formula (II).

4. A composition according to claim 3, in which, in general formula (II), each of $R_1$, $R_2$, $R_3$ and $R_4$ is methyl, each of $R_5$ and $R_6$ is hydrogen, A is an alkylene radical containing 3 to 6 carbon atoms and n is an integer from 2 to 20.

5. A composition according to claim 3 in which the polyamide having general formula (II) is present in an amount ranging from 0.01 to 5% by weight referred to the polymer weight.

6. A composition according to claim 3, in which the thermoplastic synthetic polymer is a polyolefin.

7. A composition according to claim 6, in which the polyolefin is polypropylene consisting prevailingly of isotactic macromolecules.

8. A composition according to claim 6, in which the polyamide having general formula (II) is present in an amount ranging from 0.01 to 2% by weight on the weight of the polyolefin.

9. A composition according to claim 3, in which the thermoplastic synthetic polymer is polyvinyl chloride or polyvinylidene chloride.

10. A composition according to claim 9, in which the polyamide having general formula (II) is present in an amount ranging from 0.01 to 1% by weight referred to the polymer weight.

11. A composition according to claim 3, in which the thermoplastic synthetic polymer is a polyurethane or a polyamide.

12. A composition according to claim 11, in which the polyamide having general formula (II) is present in an amount ranging from 0.01 to 5% by weight referred to the polymer weight.

13. A composition according to claim 3, in which the polyamide having general formula (II) is present in admixture with other known polymer additives.

14. A composition according to claim 13, in which the polymer additives are selected from the group consisting of antioxidants, ultraviolet ray absorbers, pigments, fillers, basic nitrogen-containing polycondensates and other known stabilizers.

15. A composition according to claim 13, in which the ratio by weight of the other polymer additives to the polyamide having general formula (II) is from 0.5:1 to 3:1.

* * * * *